(12) United States Patent
Høeg et al.

(10) Patent No.: US 10,480,483 B2
(45) Date of Patent: Nov. 19, 2019

(54) SERRATED TRAILING EDGE PANEL FOR A WIND TURBINE BLADE

(71) Applicant: LM WP PATENT HOLDING A/S, Kolding (DK)

(72) Inventors: Jesper Høeg, Kolding (DK); Kim Ansholm Rasmussen, Kolding (DK); Casper Kildegaard, Kolding (DK); Kristian Lehmann Madsen, Fredericia (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 16/072,939

(22) PCT Filed: Feb. 7, 2017

(86) PCT No.: PCT/EP2017/052640
§ 371 (c)(1),
(2) Date: Jul. 26, 2018

(87) PCT Pub. No.: WO2017/137394
PCT Pub. Date: Aug. 17, 2017

(65) Prior Publication Data
US 2019/0078549 A1    Mar. 14, 2019

(30) Foreign Application Priority Data

Feb. 12, 2016   (EP) .................................. 16155507

(51) Int. Cl.
*F03D 1/06*           (2006.01)
(52) U.S. Cl.
CPC ......... *F03D 1/0633* (2013.01); *F03D 1/0675* (2013.01); *F05B 2240/30* (2013.01);
(Continued)

(58) Field of Classification Search
CPC ............................ F03D 1/0641; F03D 1/0683
See application file for complete search history.

(56) References Cited

U.S. PATENT DOCUMENTS

| | | | | |
|---|---|---|---|---|
| 3,930,750 A | * | 1/1976 | Schultz | .................. F03D 3/065 416/197 A |
| 5,088,665 A | * | 2/1992 | Vijgen | .................. B64C 23/06 244/198 |

(Continued)

FOREIGN PATENT DOCUMENTS

| | | |
|---|---|---|
| EP | 1314885 A1 | 11/2002 |
| EP | 1314885 A1 | 5/2003 |

(Continued)

OTHER PUBLICATIONS

Extended European Search Report dated Dec. 11, 2018 corresponding to application No. 18193641.0-1007.

(Continued)

*Primary Examiner* — Woody A Lee, Jr.
(74) *Attorney, Agent, or Firm* — Nath, Goldberg & Meyer; Jerald L. Meyer; Tanya E. Harkins

(57) ABSTRACT

A serrated panel (70) for a wind turbine blade is disclosed. The panel (70) is configured to be attached to the trailing edge of a blade to form a plurality of serrations (71) at the trailing edge of the blade. The serrated panel comprises a base part (72) for attaching the panel (70) to the trailing edge of the blade. An exterior surface (78) of the base part comprises a corrugated surface in direction between longitudinal ends of the panel such that the exterior surface comprises crests (82) aligned substantially with midpoints of bases (80) of the serrations (71) and valleys (83) aligned substantially between serrations (71).

16 Claims, 4 Drawing Sheets

(52) U.S. Cl.
CPC ... *F05B 2240/301* (2013.01); *F05B 2250/183* (2013.01); *F05B 2250/184* (2013.01); *F05B 2250/70* (2013.01); *F05B 2250/71* (2013.01); *F05B 2260/96* (2013.01); *F05B 2280/6003* (2013.01); *Y02E 10/721* (2013.01)

(56) References Cited

U.S. PATENT DOCUMENTS

| | | | | |
|---|---|---|---|---|
| 10,240,576 B2* | 3/2019 | Drack | | F03D 1/0641 |
| 2008/0298967 A1* | 12/2008 | Matesanz Gil | | F03D 1/0608 |
| | | | | 416/146 R |
| 2010/0047070 A1* | 2/2010 | Slot | | F03D 1/065 |
| | | | | 416/146 R |
| 2011/0142635 A1* | 6/2011 | Fritz | | F03D 1/0675 |
| | | | | 416/62 |
| 2011/0142637 A1* | 6/2011 | Riddell | | F03D 1/0633 |
| | | | | 416/62 |
| 2013/0266441 A1* | 10/2013 | Enevoldsen | | F03D 7/0204 |
| | | | | 416/23 |
| 2014/0301864 A1* | 10/2014 | Singh | | F03D 1/0608 |
| | | | | 416/90 R |
| 2015/0010407 A1* | 1/2015 | Zamora Rodriguez | | F03D 1/0641 |
| | | | | 416/236 R |
| 2015/0267678 A1* | 9/2015 | Obrecht | | F03D 1/0633 |
| | | | | 416/228 |
| 2016/0312763 A1* | 10/2016 | Arce | | F03D 1/0633 |
| 2017/0107971 A1* | 4/2017 | Singh | | F03D 1/0683 |
| 2017/0145990 A1* | 5/2017 | Drack | | F03D 1/0641 |
| 2017/0298740 A1* | 10/2017 | Vathylakis | | F03D 1/0633 |
| 2018/0057141 A1* | 3/2018 | Shormann | | F04D 29/18 |
| 2018/0238298 A1* | 8/2018 | Grasso | | F03D 1/0641 |
| 2018/0347540 A1* | 12/2018 | Hurault | | F03D 1/0675 |
| 2019/0032631 A1* | 1/2019 | Hoffmann | | F03D 1/0641 |

FOREIGN PATENT DOCUMENTS

| | | |
|---|---|---|
| WO | 2012019655 A1 | 2/2012 |
| WO | 2017088880 A1 | 6/2017 |

OTHER PUBLICATIONS

Extended European Search Report dated Dec. 11, 2018 corresponding to application No. 18193626.1-1007.

* cited by examiner

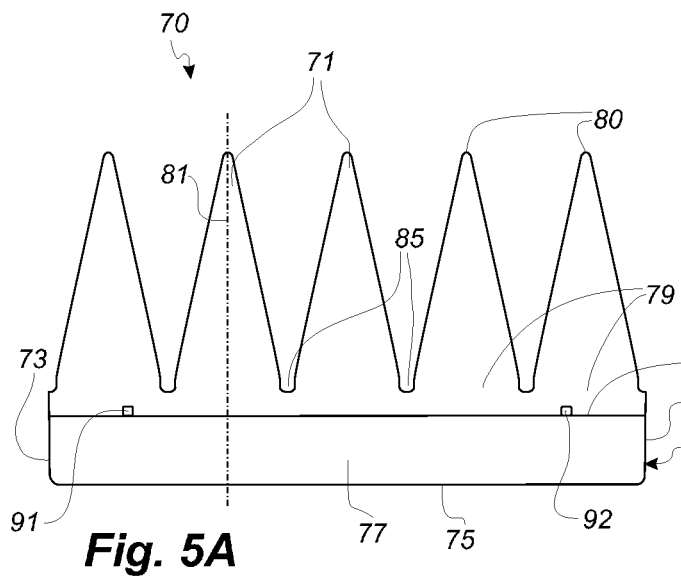
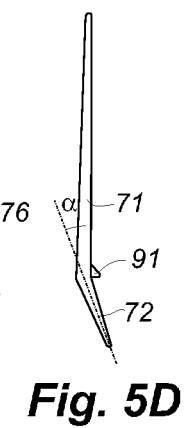
Fig. 5A
Fig. 5D
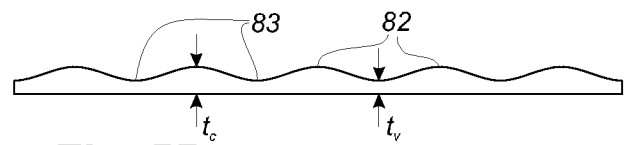
Fig. 5B
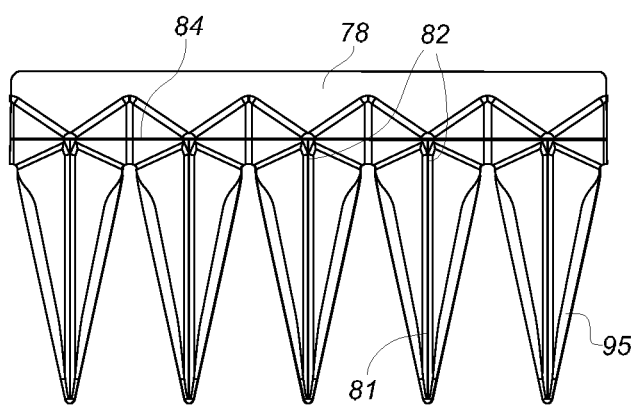
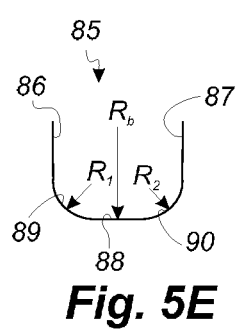
Fig. 5E
Fig. 5C

SERRATED TRAILING EDGE PANEL FOR A WIND TURBINE BLADE

This is a National Phase Application filed under 35 U.S.C. 371 as a national stage of PCT/EP2017/052640, filed Feb. 2, 2017, an application claiming the benefit of European Application No. 16155507.3, filed Feb. 12, 2016, the content of each of which is hereby incorporated by reference in its entirety.

FIELD OF THE INVENTION

The present invention relates to a serrated trailing edge panel for a wind turbine blade as well as a wind turbine blade provided with such a serrated trailing edge panel.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency. However, complaints have arisen about the creation of noise associated with the operation of wind power plants. Hence, noise reducing devices and associated blade designs are increasingly desired.

One of the continued considerations for wind turbine blade design is the operational noise produced when such blades rotate, in particular for on-shore wind turbine installations. A portion of such noise is generated from airflow leaving the profile of a wind turbine blade at the blade trailing edge, and is often referred to as trailing edge noise.

As modern wind turbine blades are manufactured at increasingly longer blade lengths, the longer span of the blades results in higher relative wind speeds experienced by the blades. Accordingly, this can lead to relatively large levels of trailing edge noise.

To this end, modern wind turbine blades are sometimes provided with serrations along the blade trailing edges, in an effort to reduce blade trailing edge noise and/or to improve wind turbine blade efficiency, as can be seen in EP1314885. The serration are typically provided by attaching a serrated panel at the trailing edge of the wind turbine blade. While the noise mitigating properties of such serrations are advantageous, several drawbacks remain. Often, finding the right serration geometry is a trade-off between noise mitigation performance and structural requirements. This may lead to the need for thick trailing edge regions, especially near the serration base. This increased thickness has been found by the present inventions to become a potential source of additional noise.

Further, the panels may be rather stiff, which may lead to increased peeling forces and stress concentrations going into the laminate structure of the blade, in particular at the longitudinal ends of the panel.

There are several ways of attaching a panel to the trailing edge of the blade. US 2011/0142635 A1 describes a blade extension panel provided with a cutaway mounting portion for mounting the extension panel to the blade such that the blade extension is substantially flush with a surface of the blade. The cutaway portion defines a notch configured to locate the blade extension relative to the rotor blade. However, such an embodiment entails that the cutaway portion must be specifically designed for a specific portion of a wind turbine blade.

Accordingly, there is still a need to optimise the design of such serrations or trailing edge serration panels in order to maximise noise mitigation.

It is therefore an object of the invention to provide a wind turbine blade having an improved trailing edge configuration as well as a trailing edge serration panel for arrangement at the trailing edge of a wind turbine blade.

It is another object of the invention to provide a wind turbine blade design having serrations as well as a trailing edge serration panel, which design provide improved noise reduction during operation.

SUMMARY OF THE INVENTION

According to the invention, there is provided a serrated panel for a wind turbine blade, wherein the panel is configured to be attached to the trailing edge of a blade to form a plurality of serrations at the trailing edge of the blade, wherein the serrated panel comprises:
 a base part for attaching the panel to the trailing edge of the blade, the base part having
  a first longitudinal end for arrangement nearest a tip end of the wind turbine blade,
  a second longitudinal end for arrangement nearest a root end of the wind turbine blade,
  a first side for arrangement nearest a leading edge of the blade,
  a second side for arrangement farthest from the leading edge of the blade,
  an attachment surface for attaching to an exterior surface of the wind turbine blade, and
  an exterior surface facing away from the exterior surface of the wind turbine blade, when the serrated panel is attached to the wind turbine blade, and
 a plurality of serrations extending from the second side of the base part, wherein the serrations comprise a base proximal to second side of the base part, and an apex distal to the second side of the base part with a notional line extending from a midpoint of the base to the apex.

According to a first aspect, the exterior surface of the base part comprises a corrugated surface in direction between the first longitudinal end and the second longitudinal end such that the exterior surface comprises crests aligned substantially with the midpoints of bases of the serrations and valleys aligned substantially between serrations.

This design makes it possible to decrease the thickness of the panel and reduce the longitudinal stiffness, which in turn leads to decreased peeling forces and stress concentrations going into the blade laminate, in particular at the longitudinal ends of the panels. The thin parts, i.e. the valleys, of the panel, result in less force transferred to the panel when subjected to blade straining, e.g. from blade deflections. The thick parts, i.e. the crests, of the panel provide higher stiffness to the serrations so as to ensure them to withstand aerodynamic loading and prevent fluttering. In addition hereto, the corrugated design has surprisingly been found to provide more efficient noise mitigation than serrated panels having a uniform thickness in the longitudinal direction.

According to a second aspect, the serrations comprises a shape and are mutually spaced so that a slit is formed between adjacent serrations, wherein each of the slits comprises a first side wall at a first adjacent serration and a second side wall at a second adjacent serration and a connecting surface extending between the first side wall and the second side wall, wherein the connecting surface is substantially flat or flattened and comprises a first rounded surface at the first sidewall and a second rounded surface at the second side wall.

In other words, the slit does not have a fully rounded or semi-circular end section near the base part of the serrated panel, but comprises a flattened surface with rounded portions at the sidewalls. The flattened part may have a radius of curvature (and thus form part of circular path). However, the radius of curvature of the flattened part is larger than the radius of curvature of the first rounded surface and the second round surface. Such a design has surprisingly been found to further reduce stress between serrations compared to conventional serrated panels, and thus lower the risk of damages to the serrated panel, when the wind turbine blade bends due to pressure fluctuations.

It is clear that the connecting surface is arranged proximal to the second side of the base part and that the first sidewall and second sidewall extend in a direction away from the second side of the base part.

According to a third aspect, the serrated panel comprises two discrete alignment protrusions that protrude from an attachment side of the serrated panel, the two discrete alignment notches being configured to abut a trailing edge of the wind turbine blade and thereby align the serrated panel relative to the trailing edge of the blade. The increased reliability of positioning the serrated panel correctly ensures less noise defects due to misalignments, which in turn ensures a better overall noise reduction performance.

Thereby, a serrated panel is provided which may easily be aligned with the trailing edge and will facilitate an easier and quicker mounting of the panels. The use of exactly two discrete alignment protrusions ensures that the panel fits to all sections of the trailing edge irrespective of the shape and curve of the trailing edge of the blade.

According to a fourth aspect, the invention provides a wind turbine blade having a profiled contour including a pressure side and a suction side, and a leading edge and a trailing edge with a chord having a chord length extending therebetween, the wind turbine blade extending in a spanwise direction between a root end and a tip end, the wind turbine blade comprising at least one serrated panel according to any of the preceding aspects and provided along at least a portion of the trailing edge of the blade. The at least one serrated panel may be any of the panels according to the first, the second or the third aspects or be a combination thereof.

In the following a number of advantageous embodiments will be described. The embodiments may be applied to any of the first, the second, the third, and the fourth aspects of the invention or combinations thereof.

According to a first embodiment, the base part comprises a maximum thickness line extending in a direction between the first longitudinal end and the second longitudinal end, the maximum thickness line defining the position, where the serrated panel in a transverse cross-sectional view has a maximum thickness. The maximum thickness line may be positioned with a spacing from the first side of the base part.

In one advantageous embodiment, the base part is tapered from the maximum thickness line towards the first side of the base part. This provides a smooth transition to the surface of the blade.

The base part may for instance comprise substantially triangular surface that extend from valleys at the first side of the base part and to a crest at the maximum thickness line.

In another advantageous embodiment, the serrations, and optionally the base part, are tapered from the maximum thickness line towards the apexes of the serrations. This provides a gradual transition towards the apex of the serrations, which has advantages both in relation to stiffness transition and noise mitigation.

The crests advantageously extend from the base part of the serrations and along the notional line of the serrations.

In an advantageous embodiment, a ratio between a thickness of the crest and a thickness of the valley is at least 3:2 and preferably at least 2:1. In another advantageous embodiment, the ratio between a thickness of the crest and a thickness of the valley is at most 5:1.

In yet another embodiment, the first sidewall and the second sidewall comprises a section, where the first sidewall and the second sidewall are substantially parallel.

In one embodiment, the connecting surface has a curvature of radius ($R_b$), which is larger than those ($R_1$,$R_2$) of the first rounded surface and the second rounded surface. $R_b$ is advantageously at least 5 times, more advantageously at least 7 times, and even more advantageously at least 10 times larger than $R_1$ and $R_2$. If the connecting surface is straight, $R_b$ approaches infinity.

In one embodiment, the two discrete alignment protrusions are arranged on the attachment surface of the base part. Thereby, the alignment protrusions may be arranged to very accurately align the attachment part of the serrated panel to the trailing edge of the blade.

In another embodiment, the two discrete alignment protrusions are arranged near the second side of the base part. Thereby, it is ensured that only the serrations themselves extend from the trailing edge of the blade.

In yet another embodiment, a first discrete protrusion is arranged near the first longitudinal end of the base part and a second discrete protrusion is arranged near the second longitudinal end of the base part. Thereby, it is ensured that the serrated panel may extend along and substantially parallel to a large part of the trailing edge.

In principle, the protrusions may also be arranged on the serrations, preferably near the base of the serrations.

The serrated panels may be made in a polymer material, such as polyurethane or polycarbonate, or from a fibre-reinforced polymer material.

In an advantageous embodiment, the serrated panels comprises at least two serrations extending from the second side of the base part, more advantageously at least three, four or five serrations.

In an advantageous embodiment, the serrated panels comprises at most 20 serrations extending from the second side of the base part, more advantageously at most 15, 12 or 10 serrations.

The invention also provides a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade comprising a profiled contour including a pressure side and a suction side, as well as a leading edge and a trailing edge with a chord having a chord length extending therebetween, the profiled contour, when being impacted by an incident airflow, generating a lift, wherein the wind turbine blade further comprises at least one serrated panel according to any of the aforementioned embodiments provided along at least a portion of the trailing edge of the blade.

DETAILED DESCRIPTION OF THE INVENTION

Embodiments of the invention will now be described, by way of example only, with reference to the accompanying drawings, in which:

FIG. 5 shows various views of a serrated panel according to the invention.

It will be understood that elements common to the different embodiments of the invention have been provided with the same reference numerals in the drawings.

Figure 1:
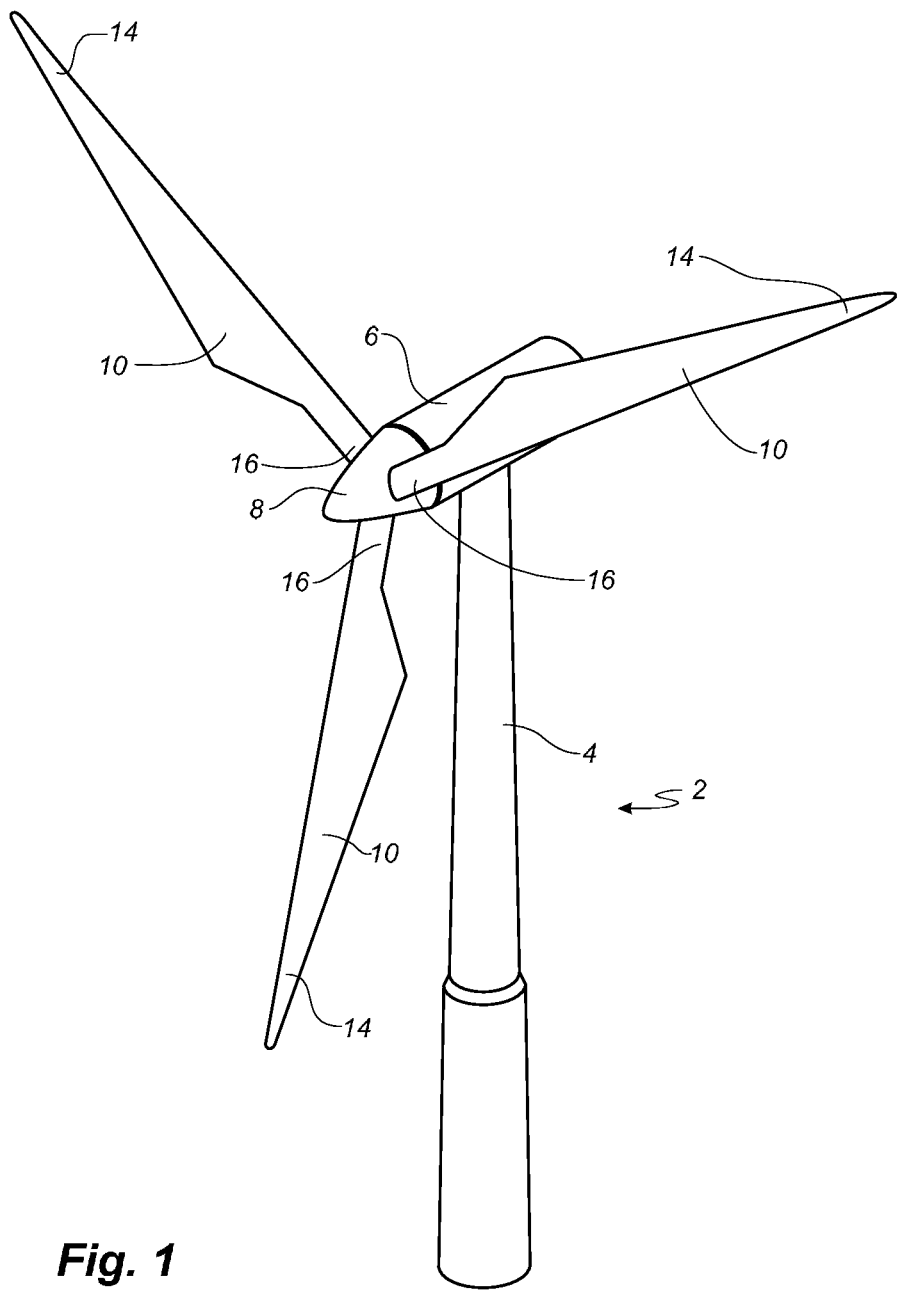
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8, the blade extending in a spanwise direction between the root 16 and the tip 14. The rotor has a radius denoted R.

Figure 2:
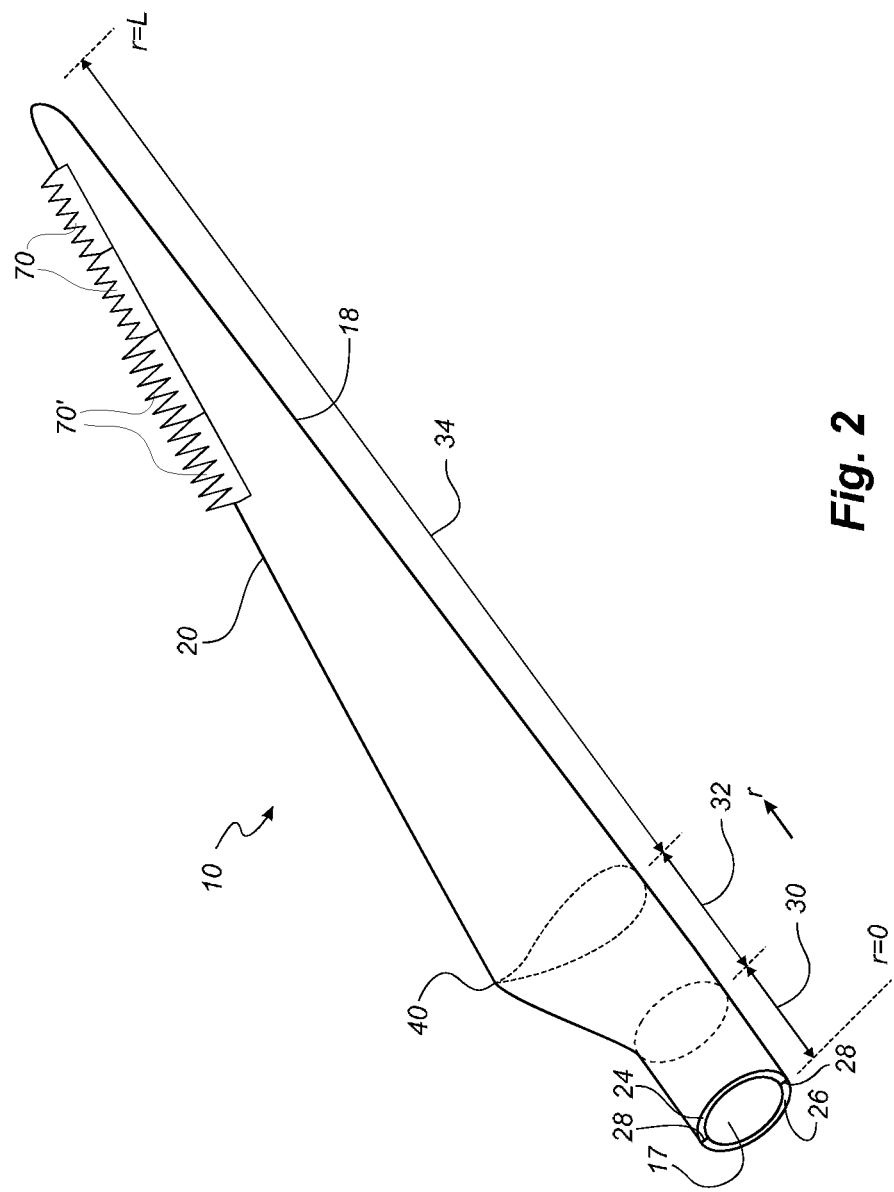
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. An array of trailing edge serrations are provided along a portion of the trailing edge 20 of the blade. In general, flow of air over the wind turbine blade 10 extends from the leading edge 18 to the trailing edge 20 in a generally transverse or chordwise direction. While the serrations in FIG. 2 are depicted as being arranged along a outboard portion of the blade, it is recognised that the serrations may be arranged for instance closer to the root of the blade 10, or that they may be arranged along for instance the entire airfoil region 34 of the blade 10.

According to the inventions, the serrations are provided in form of serrated panels 70, 70' that are attached to a surface of the blade 10 at the trailing edge 20 of the blade 10. The serrated panels 70, 70' may comprise serration having different sizes. The serrations near the tip of the blade 10 may for instance as shown in FIG. 2 have a smaller dimensions than serrations closer to the root of the blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figures 3, 4:
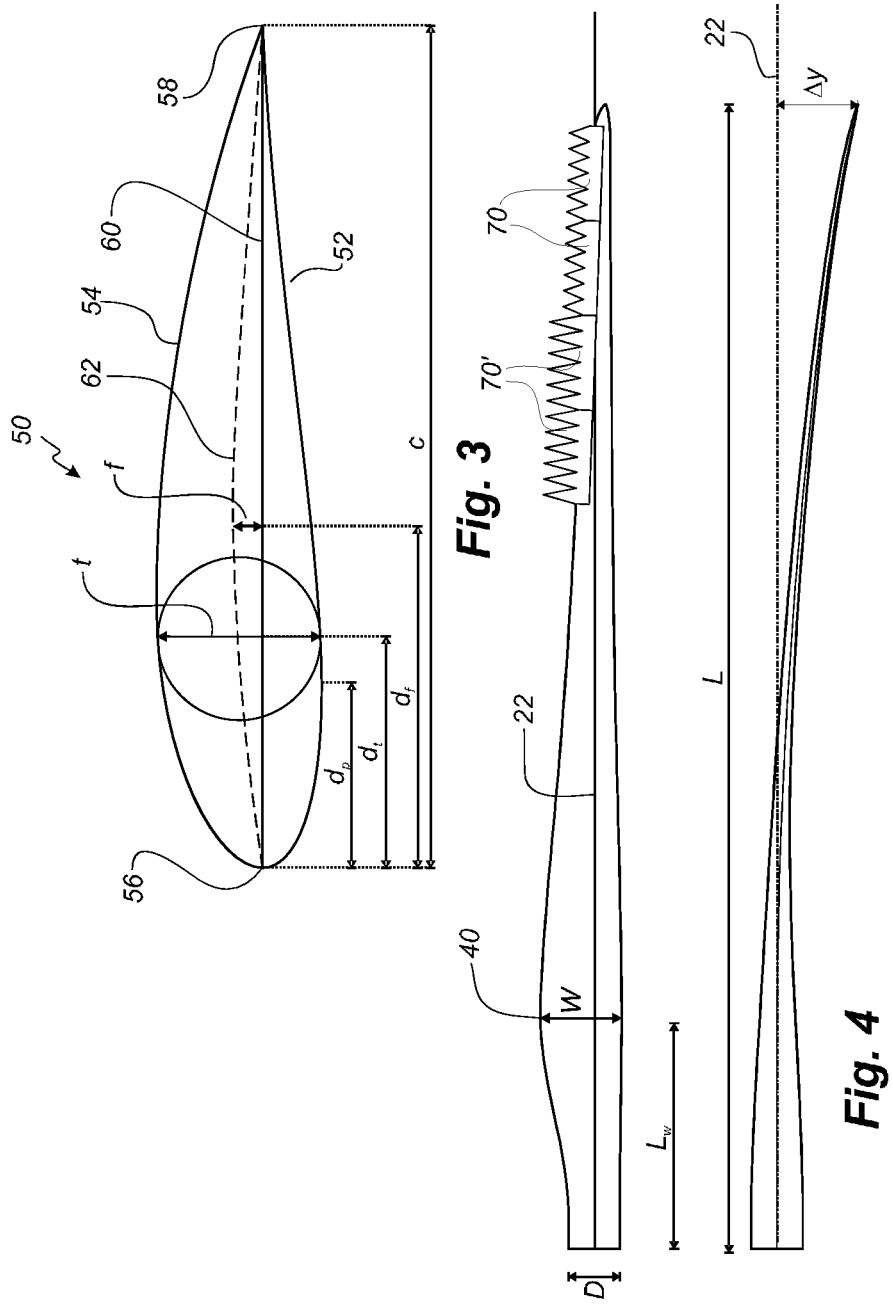
FIG. 3 shows a schematic view of an airfoil profile of the blade of FIG. 2.
FIG. 4 shows a schematic view of the wind turbine blade of FIG. 2, seen from above and from the side.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a pre-bend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 metres in length, having blade root diameters of several metres.

Wind turbine blades are generally designed for relatively long lifetimes and to withstand considerable structural and dynamic loading.

FIG. 5 shows various views of a serrated panel 70 according to the invention, where FIG. 5A shows a bottom view, FIG. 5B shows a side view, FIG. 5C shows a top view, FIG. 5D shows an end view, and FIG. 5E shows a detail of the serrated panel 70.

The serrated panel 70 (also called a serrated trailing edge panel) is configured to be attached to the trailing edge 20 of the blade 10 to form a plurality of serrations 71 at and projecting from the trailing edge of the blade. The serrated panel 70 comprises a base part for attaching the panel to the trailing edge of the blade. The base part 72 has a first longitudinal end 73 for arrangement nearest a tip end of the wind turbine blade, a second longitudinal end 74 for arrangement nearest a root end of the wind turbine blade, a first side 75 for arrangement nearest a leading edge of the blade, a second side 76 for arrangement farthest from the leading edge of the blade, an attachment surface 77 for attaching to an exterior surface of the wind turbine blade 10, and an exterior surface 78 facing away from the exterior surface of the wind turbine blade 10, when the serrated panel 70 is attached to the wind turbine blade 10.

The serrated panel 70 further comprises a plurality of serrations 71 extending from the second side 76 of the base part 72. The serrations 71 each comprise a base 79 proximal to second side 76 of the base part, and an apex 80 distal to the second side 76 of the base part 72 with a notional line 81 extending from a midpoint of the base 79 to the apex 80.

According to a first aspect, the exterior surface 78 of the base part may comprise a corrugated surface in direction between the first longitudinal end 73 and the second longitudinal end 74 such that the exterior surface comprises crests 82 aligned substantially with the midpoints of bases 80 of the serrations 71 and valleys 83 aligned substantially between serrations 71.

This corrugated design makes it possible to decrease the thickness of the panel 71 and reduce the longitudinal stiffness, which in turn leads to decreased peeling forces and stress concentrations going into the blade laminate, in particular at the longitudinal ends 73, 74 of the panels 70. The thin parts, i.e. the valleys 83, of the panel 70 result in less force transferred to the panel when subjected to blade straining, e.g. from blade deflections. The thick parts, i.e. the crests 82, of the panel 70 provide higher stiffness to the serrations 71 so as to ensure them to withstand aerodynamic loading and prevent fluttering. In addition hereto, the corrugated design has surprisingly been found to provide more efficient noise mitigation than serrated panels having a uniform thickness in the longitudinal direction.

The corrugated surface may for instance be triangular or saw tooth shaped, e.g. with rounded valleys and crests. The corrugated surface may also be substantially sinusoidal.

The base part 72 of the serrated panel 70 may further comprise a maximum thickness line 84 extending between the first longitudinal end 75 and the second longitudinal end 76, wherein the maximum thickness line 84 defines the position, where the serrated panel in a transverse cross-sectional view has a maximum thickness. The maximum thickness line may be positioned with a spacing from the first side 75 of the base part 72, and the base part 72 may further be tapered from the maximum thickness line 84 towards the first side 75 of the base part 72, e.g. as shown in the side view in FIG. 5D. Thereby, a smooth transition to the surface of the wind turbine blade may be achieved.

The base part 72 may as indicated in FIG. 5C comprise substantially triangular surface parts that extend from valleys 82 at the first side 75 of the base part 72 and to a crest 83 at the maximum thickness line 84.

The serrations 71 (and optionally the base part 72) may as indicated in the side view in FIG. 5D tapered from the maximum thickness line 84 towards the apexes 80 of the serrations 71.

The crests may as shown in FIG. 5C extend from the base part 76 of the serrations 71 and along the notional line 82 of the serrations 71.

As shown in FIG. 5B, the thickness of the crests is defined at $t_c$ and the thickness of the valleys is defined as $t_v$. The ratio between $t_c$ and $t_v$ (e.g. at the maximum thickness line 84) may be at least 3:2 and advantageously at least 2:1. The serrations 71 may advantageously further have rounded edges 95.

According to a second aspect, the serrations 71 may comprise a shape and are mutually spaced so that a slit 85 is formed between adjacent serrations 71. FIG. 5E shows a detail of such a slit 85. Each of the slits 85 comprises a first side wall 86 at a first adjacent serration and a second side wall 87 at a second adjacent serration and further a connecting surface 88 extending between the first side wall 86 and the second side wall 87. The connecting surface 88 is substantially flat or flattened and comprises a first rounded surface 89 at the first sidewall 86 and a second rounded surface 90 at the second side wall 87. In other words, the slit does not have a fully rounded or semi-circular end section near the base part of the serrated panel, but comprises a flattened surface with rounded portions at the sidewalls. The flattened part may have a radius of curvature (and thus form part of circular path). However, the radius of curvature of the flattened part is larger than the radius of curvature of the first rounded surface and the second round surface. Such a design has surprisingly been found to further reduce stress between serrations compared to conventional serrated panels, and thus lower the risk of damages to the serrated panel, when the wind turbine blade bends due to pressure fluctuations.

In one embodiment, the connecting surface 88 has a curvature of radius ($R_b$), which is larger than those $R_1$, $R_2$ of the first rounded surface and the second rounded surface. $R_b$ is advantageously at least 10 times larger than $R_1$ and $R_2$.

According to a third aspect, the serrated panel 70 may be provided with two discrete alignment protrusions 91, 92 that protrude from an attachment side 72 of the serrated panel 70. The two discrete alignment notches may be configured to abut the trailing edge 20 of the wind turbine blade 10 and thereby align the serrated panel 70 relative to the trailing edge 20 of the blade 10. The two discrete alignment protrusions 91, 92 may be arranged near the second side 76 of the base part 70. The discrete alignment protrusions are advantageously arranged near the first longitudinal end 73 of the base part 72 and the second longitudinal end 74 of the base part 72, respectively.

The serrations 71 of the serrated panel 70 may be angled relative to the base part 72 of the serrated panel, such that the base part 72 and the serrations 71 form an angle α. The angle α may be zero degrees, in which case the serrated panel 70 is straight. For angled serrated panels, the angle α may be between 2 and 15 degrees, typically around 5 or 10 degrees.

The invention is not limited to the embodiments described herein, and may be modified or adapted without departing from the scope of the present invention.

The invention claimed is:

1. A serrated panel (70) for a wind turbine blade, wherein the serrated panel (70) is configured to be attached to a trailing edge of the wind turbine blade to form a plurality of serrations (71) at the trailing edge of the wind turbine blade, wherein the serrated panel comprises:
- a base part (72) adapted for attaching the panel (70) to the trailing edge of the wind turbine blade, the base part (72) comprising:
  - a first longitudinal end (73) adapted for arrangement nearest a tip end of the wind turbine blade;
  - a second longitudinal end (74) adapted for arrangement nearest a root end of the wind turbine blade;
  - a first side (75) adapted for arrangement nearest a leading edge of the wind turbine blade;
  - a second side (76) adapted for arrangement farthest from the leading edge of the wind turbine blade;
  - an attachment surface (77) adapted for attaching to an exterior surface of the wind turbine blade; and
  - an exterior surface (78) adapted to face away from the exterior surface of the wind turbine blade when the serrated panel (70) is attached to the wind turbine blade,
- wherein the plurality of serrations (71) extend from the second side (76) of the base part (72), wherein the plurality of serrations (71) comprise a base (79) proximal to the second side (76) of the base part (72), and an apex (80) distal to the second side (76) of the base part (72) with a notional line (81) extending from a midpoint of the base (79) to the apex (80), and
- wherein the exterior surface (78) of the base part (72) comprises a corrugated surface in a direction between the first longitudinal end (73) and the second longitudinal end (74) such that the exterior surface (78) comprises crests (82) aligned substantially with respective midpoints of the bases (79) of the plurality of serrations (71), with valleys (83) of the exterior surface (78) being respectively aligned substantially between serrations (71).

2. The serrated panel (70) according to claim 1, wherein the base part (72) comprises a maximum thickness line (84) extending in a direction between the first longitudinal end (75) and the second longitudinal end (76).

3. The serrated panel (70) according to claim 2, wherein the maximum thickness line (84) is positioned with a spacing from the first side (75) of the base part (72).

4. The serrated panel (70) according to claim 3, wherein the base part (72) is tapered from the maximum thickness line towards the first side (75) of the base part (72).

5. The serrated panel according to claim 3, wherein the base part comprises a triangular surface that extends from one of the valleys (83) positioned at the first side (75) of the base part to one of the crests (82) positioned at the maximum thickness line.

6. The serrated panel (70) according to claim 2, wherein the serrations are tapered from the maximum thickness line towards the apexes (80) of the serrations (71).

7. The serrated panel (70) according to claim 6, wherein the base part (72) is tapered from the maximum thickness line towards the apexes (80) of the serrations (71).

8. The serrated panel (70) according to claim 1, wherein the crests extend from the base part (72) of the serrations (71) and along the notional line (82) of the serrations.

9. The serrated panel (70) according to claim 1, wherein a ratio between a thickness of each said crest and a thickness of each said valley is at least 2:1.

10. The serrated panel (70) according to claim 1, wherein the ratio between a thickness of each said crest and a thickness of each said valley is at most 5:1.

11. The serrated panel (70) according to claim 1, wherein the serrations are mutually spaced so that a slit is formed between adjacent ones of the serrations, wherein each of the slits (85) comprises a first side wall (86) at a first adjacent serration and a second side wall (87) at a second adjacent serration and a connecting surface (88) extending between the first side wall (86) and the second side wall (87), wherein the connecting surface (88) is flattened and comprises a first rounded surface (89) at the first sidewall (86) and a second rounded surface (90) at the second side wall (87).

12. The serrated panel (70) according to claim 11, wherein the first sidewall and the second sidewall comprise a section, where the first sidewall and the second sidewall are substantially parallel.

13. The serrated panel (70) according to claim 11, wherein the connecting surface has a radius of curvature (Rb), which is larger than a radius of curvature of the first rounded surface (R1) and a radius of curvature of the second rounded surface (R2).

14. The serrated panel (70) according to claim 1, wherein the serrated panel (70) comprises two discrete alignment protrusions (91, 92) that protrude from an attachment side of the serrated panel (70), the two discrete alignment protrusions being configured to abut about the trailing edge of the wind turbine blade and thereby align the serrated panel (70) relative to the trailing edge of the wind turbine blade.

15. The serrated panel (70) according to claim 14, wherein the two discrete alignment protrusions comprise a first discrete alignment protrusion and a second discrete alignment protrusion, the first discrete alignment protrusion being arranged adjacent to the first longitudinal end of the base part, and the second discrete alignment protrusion being arranged adjacent to the second longitudinal end of the base part.

16. A wind turbine blade (10) having a profiled contour including a pressure side and a suction side, and a leading edge (18) and a trailing edge (20) with a chord having a chord length extending therebetween, the wind turbine blade (10) extending in a spanwise direction between a root end and a tip end, the wind turbine blade comprising at least one serrated panel according to claim 1 and provided along at least a portion of the trailing edge (20) of the wind turbine blade (10).

* * * * *